United States Patent
Bosworth

(10) Patent No.: US 10,906,632 B2
(45) Date of Patent: Feb. 2, 2021

(54) SYSTEMS AND METHODS FOR CONTROLLED FILTERING OF AIRCRAFT CONTROL INPUT

(71) Applicant: Bell Helicopter Textron Inc., Fort Worth, TX (US)

(72) Inventor: Jeffrey Bosworth, Flower Mound, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 279 days.

(21) Appl. No.: 15/987,059

(22) Filed: May 23, 2018

(65) Prior Publication Data
US 2019/0359321 A1    Nov. 28, 2019

(51) Int. Cl.
*G01M 1/14*    (2006.01)
*B64C 13/16*    (2006.01)
*G01P 13/02*    (2006.01)

(52) U.S. Cl.
CPC ............ *B64C 13/16* (2013.01); *G01P 13/025* (2013.01)

(58) Field of Classification Search
CPC ..... B64C 13/16; B64C 39/005; G01P 13/025; H03D 3/006; G05B 13/045; G05B 2219/39024; G05B 2219/45071
USPC ........ 701/8, 10–11, 3–4; 318/561, 620, 621; 244/75.1, 224, 228, 178, 181; 73/170.02
See application file for complete search history.

(56) References Cited

U.S. PATENT DOCUMENTS

| 4,741,501 | A | 5/1988 | Clelford et al. |
| 5,935,177 | A | 8/1999 | Cox et al. |
| 6,259,223 | B1 * | 7/2001 | Buck ..................... G05B 11/36 318/610 |
| 6,442,197 | B1 * | 8/2002 | Staszewski ............ G11B 20/10 375/229 |
| 9,771,145 | B2 | 9/2017 | Kim et al. |
| 2009/0292410 | A1 | 11/2009 | Fabre |
| 2013/0211631 | A1 | 8/2013 | Yates et al. |
| 2015/0142215 | A1 | 5/2015 | Oltheten et al. |
| 2018/0312261 | A1 * | 11/2018 | Vickers .................. G05D 23/24 |

* cited by examiner

*Primary Examiner* — Dalena Tran
(74) *Attorney, Agent, or Firm* — Shackelford, Bowen, McKinley & Norton, LLP

(57) ABSTRACT

In one embodiment, a method is performed by a control computer. The method includes receiving a time series of control inputs in relation to a control axis of an aircraft, where the control computer causes actuation in response to each control input in the time series as the control input is received. The method also includes determining aircraft oscillation over a sample period corresponding to the time series. The method also includes evaluating information related to the determined aircraft oscillation using engagement settings associated with a control filter. The method also includes engaging the control filter responsive to the information satisfying the engagement settings, where the engaged control filter systematically attenuates future control inputs in relation to the control axis prior to actuation responsive thereto.

19 Claims, 7 Drawing Sheets

000# SYSTEMS AND METHODS FOR CONTROLLED FILTERING OF AIRCRAFT CONTROL INPUT

BACKGROUND

Technical Field

The present disclosure relates generally to aircraft control and more particularly, but not by way of limitation, to systems and methods for controlled filtering of aircraft control input.

History of Related Art

Pilot-augmented oscillation can occur when a pilot of an aircraft inadvertently commands an often increasing series of corrections in opposite directions, each an attempt to cover the aircraft's reaction to the previous input with an overcorrection in the opposite direction. Such oscillation can be caused by reduced phase margin induced by the lag of the pilot's response. Control filters on the pilot's commands can reduce the severity of pilot-augmented oscillations. However, control filters also generally have the cost of reducing overall control responsiveness in the aircraft.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one embodiment, a method is performed by a control computer. The method includes receiving a time series of control inputs in relation to a control axis of an aircraft, where the control computer causes actuation in response to each control input in the time series as the control input is received. The method also includes determining aircraft oscillation over a sample period corresponding to the time series. The method also includes evaluating information related to the determined aircraft oscillation using engagement settings associated with a control filter. The method also includes engaging the control filter responsive to the information satisfying the engagement settings, where the engaged control filter systematically attenuates future control inputs in relation to the control axis prior to actuation responsive thereto.

In one embodiment, a flight control computer for an aircraft includes a first control filter and first stored configurations, where the first stored configurations include first engagement settings associated with the first control filter. The flight control computer also includes a first filter controller configured to receive a first time series of control inputs in relation to a first control axis of the aircraft, where the flight control computer causes actuation in response to each control input in the first time series as the control input is received. The first filter controller is also configured to determine aircraft oscillation over a first sample period corresponding to the first time series. The first filter controller is also configured to evaluate information related to the determined aircraft oscillation using the first engagement settings. The first filter controller is also configured to engage the first control filter responsive to the information satisfying the engagement settings, where the engaged first control filter systematically attenuates future control inputs in relation to the first control axis prior to actuation responsive thereto.

In one embodiment, a computer-program product includes a non-transitory computer-usable medium having computer-readable program code embodied therein, the computer-readable program code adapted to be executed to implement a method. The method includes receiving a time series of control inputs in relation to a control axis of an aircraft, where the control computer causes actuation in response to each control input in the time series as the control input is received. The method also includes determining aircraft oscillation over a sample period corresponding to the time series. The method also includes evaluating information related to the determined aircraft oscillation using engagement settings associated with a control filter. The method also includes engaging the control filter responsive to the information satisfying the engagement settings, where the engaged control filter systematically attenuates future control inputs in relation to the control axis prior to actuation responsive thereto.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1:
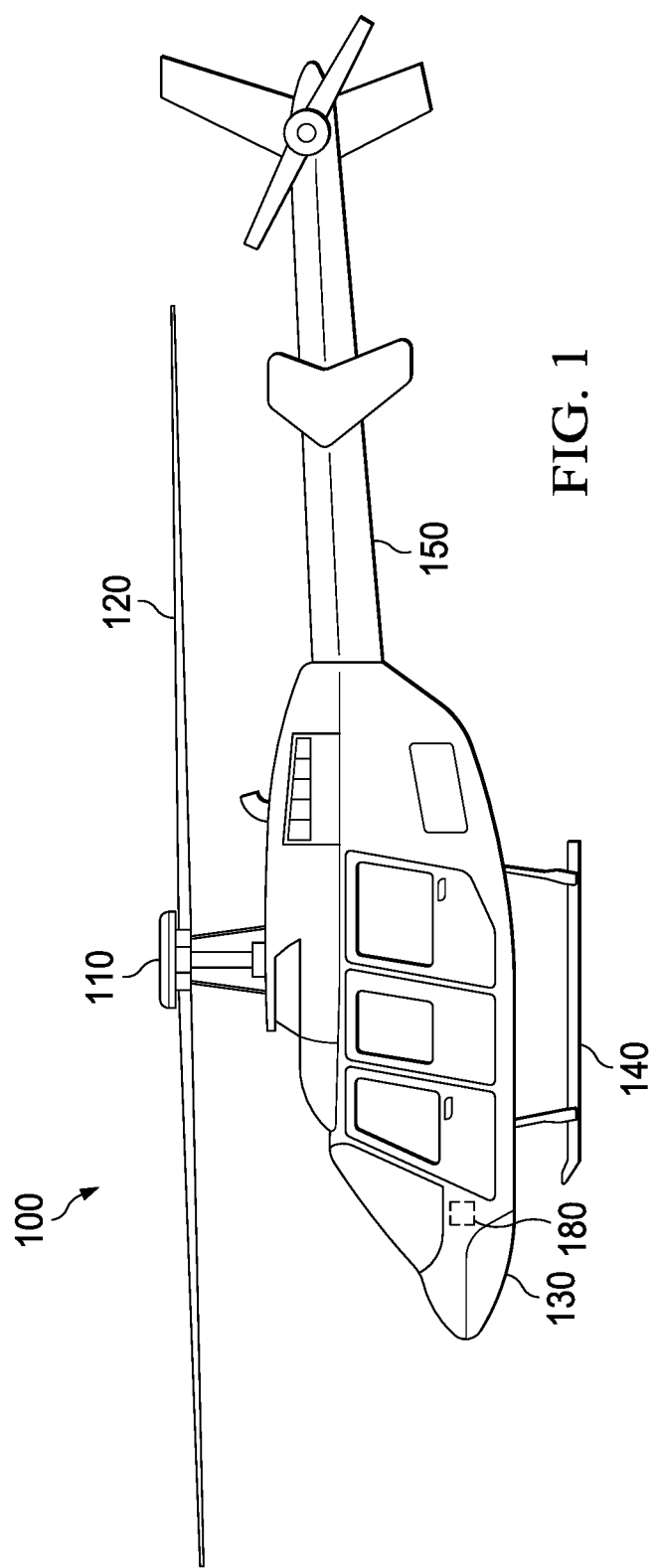
FIG. 1 illustrates an aircraft.

FIG. 1 illustrates an aircraft 100 according to one example embodiment. For illustrative purposes, the aircraft 100 is shown to be a rotorcraft. Aircraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of aircraft 100. Fuselage 130 represents the body of aircraft 100 and may be coupled to rotor system 110 such that rotor system 110 and blades 120 may move fuselage 130 through the air. Landing gear 140 supports aircraft 100 when aircraft 100 is landing and/or when aircraft 100 is at rest on the ground. Empennage 150 represents the tail section of the aircraft. Teachings of certain embodiments relating to rotor systems described herein may apply to rotor system 110 and/or other rotor systems, such as other tilt rotor and helicopter rotor systems. It should also be appreciated that teachings from aircraft 100 may apply to aircraft other than rotorcraft, such as airplanes and unmanned aircraft, to name a few examples.

A flight control computer 180 is schematically shown in fuselage 130, but it should be appreciated that the flight control computer 180 may take a number of forms and exist in a variety of locations within aircraft 100. Similarly, although flight control computer 180 is illustrated singly, flight control computer 180 can be illustrative of two, three, four or any other suitable number of flight control computers in aircraft 100, which computers can be located in same, similar or different locations within fuselage 130 or elsewhere in aircraft 100.

Flight control computer 180 can function as a fly-by-wire control system and, in a typical embodiment, is configured to control and communicate with various systems within aircraft 100 including, for example, one or more pilot flight controls. A pilot may manipulate pilot flight controls in order to achieve controlled aerodynamic flight. Inputs provided by the pilot to the pilot flight controls may be transmitted electronically to the flight control computer 180. The flight control computer 180 can include, represent or be communicably coupled to devices operable to change the flight characteristics of the aircraft such as, for example, the positions of blades 120 of FIG. 1.

Figure 2A:
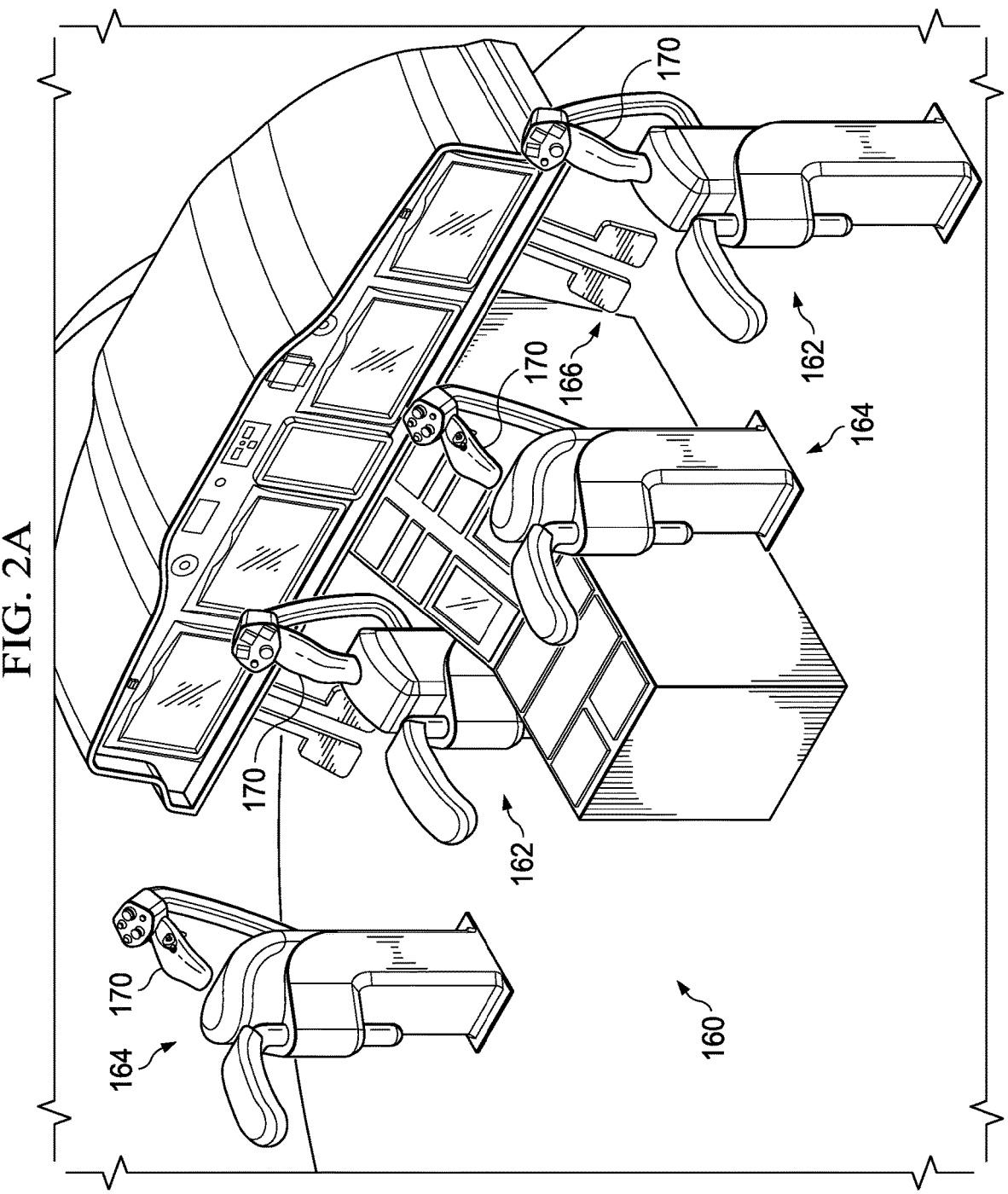
FIG. 2A illustrates a cockpit configuration of an aircraft.

FIG. 2A illustrates a cockpit configuration 160 of aircraft 100 according to one example embodiment. In the example of FIG. 2A, aircraft 100 features sets of pilot flight controls that can include, inter alia, cyclic control assemblies 162 and collective control assemblies 164. In the example of FIG. 2A, a set of each pilot flight control is provided for a pilot and a co-pilot (both of which may be referred to as a pilot for the purposes of this discussion). The cyclic control assemblies 162 and the collective control assemblies 164 are each shown to include a grip 170.

In general, cyclic pilot flight controls may allow a pilot to impart cyclic motions on blades 120, and may have a range of motion for cyclic movements, for example, of about five inches. Cyclic motions in blades 120 may cause aircraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120, and may have a range of motion for collective movements, for example, of about five inches. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

In some embodiments, cyclic control assembly 162 and collective control assembly 164 may be used in a fly-by-wire flight control system. In the example of FIG. 2A, each cyclic control assembly 162 is located to the right of a pilot seat and each collective control assembly 164 is located to the left of a pilot seat. Teachings of certain embodiments recognize that cyclic control assemblies 162 and collective control assemblies 164 may be located in any suitable position.

In some embodiments, cyclic control assembly 162 and collective control assembly 164 may be in mechanical communication with trim assembly boxes that convert mechanical inputs into fly-by-wire flight control commands. These trim assembly boxes may include, among other items, measurement devices for measuring mechanical inputs (e.g., measuring input position) and trim motors for back-driving the center positions of the cyclic control assembly 162 and/or collective control assembly 164.

Figure 2B:
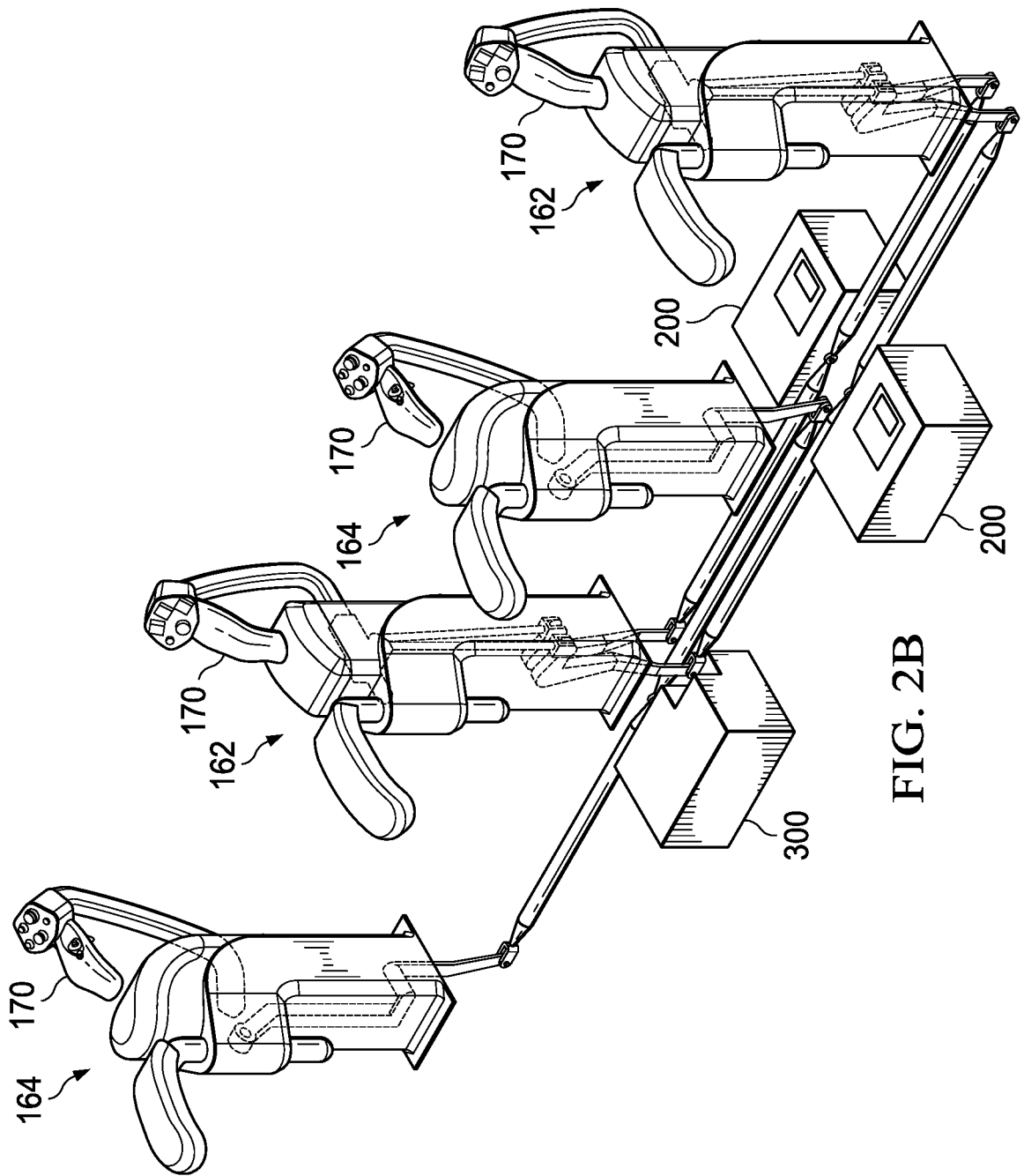
FIG. 2B illustrates an installation of cyclic control assemblies and collective control assemblies.

FIG. 2B illustrates an installation of two cyclic control assemblies 162 and two collective control assemblies 164 according to one example embodiment. In this example, the two cyclic control assemblies 162 and two collective control assemblies 164 are coupled to three integrated trim assemblies: two cyclic trim assemblies 200 and a collective trim assembly 300. One of the cyclic trim assemblies 200 manages left/right cyclic tilting movements, and the other cyclic trim assembly 200 manages front/back tilting movements.

In the example of FIG. 2B, cyclic trim assemblies 200 and collective trim assembly 300 are operable to receive and measure mechanical communications of cyclic and collective motions from the pilot. In this example, cyclic trim assemblies 200 and collective trim assembly 300 may represent components in a fly-by-wire flight control system, and the measurements from cyclic trim assemblies 200 and collective trim assembly 300 may be sent to a flight control computer operable to instruct aircraft 100 to change a position of blades 120 based on the received measurements. For example, the flight control computer may be in communication with actuators or other devices operable to change the position of blades 120.

Figure 3:
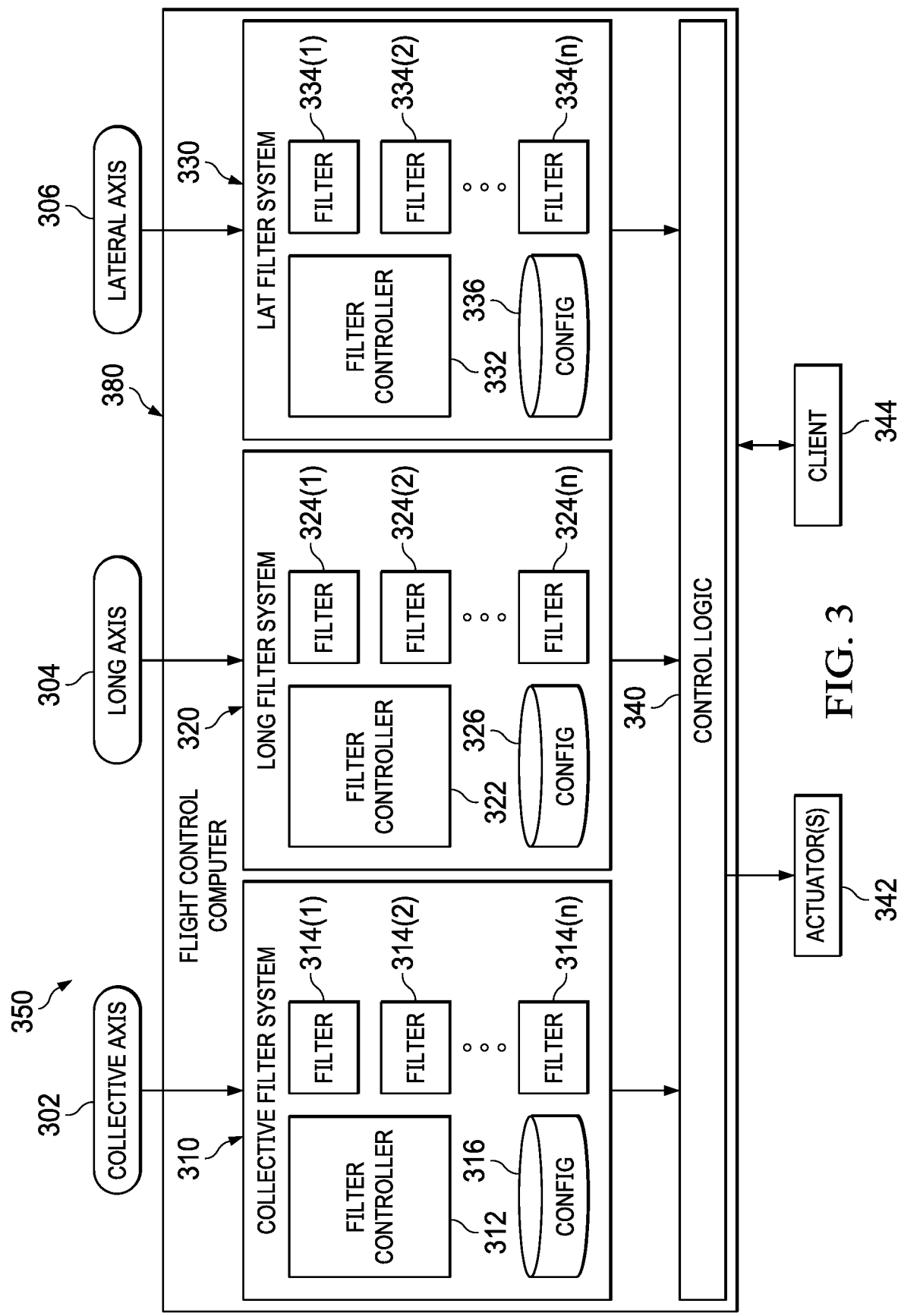
FIG. 3 illustrates an example of a filter control system.

FIG. 3 illustrates an example of a filter control system 350. In a typical embodiment, the filter control system 350 can selectively filter, or cause attenuation of, control inputs prior to any actuation based on or responsive to those control inputs. The control inputs can be received in relation to one or more control axes of an aircraft such as the aircraft 100. Although one, two, three or any other suitable number of control axes can be addressed by a given filter control system, for illustrative purposes, the filter control system 350 will be described as providing selective filtration functionality relative to each of a collective axis, a longitudinal cyclic axis and a lateral cyclic axis of an aircraft such as the aircraft 100 of FIG. 1.

The filter control system 350 includes a flight control computer 380, one or more actuators 342 and a client 344. In general, the flight control computer 380 can perform any of the fly-by-wire control functionality described above relative to the flight control computer 180 of FIG. 1. Furthermore, in the example of FIG. 3, the flight control computer 380 includes a collective filter system 310, a longitudinal filter system 320, a lateral filter system 330 and control logic 340. The collective filter system 310, the longitudinal filter system 320 and the lateral filter system 330 are shown to include, respectively, filter controllers 312, 322 and 332 and configurations 316, 326 and 336. The collective filter system 310, the longitudinal filter system 320 and the lateral filter system 330 are further shown to include, respectively, control filters 314(1), 314(2) and 314(n) (collectively, control filters 314), control filters 324(1), 324(2) and 324(n) (collectively, control filters 324) and control filters 334(1), 334(2) and 334(n) (collectively, control filters 334).

In the example of FIG. 3, the collective filter system 310 receives a collective axis input 302 corresponding to the collective axis, the longitudinal filter system 320 receives a longitudinal cyclic axis input 304 corresponding to the longitudinal cyclic axis, and the lateral filter system 330 receives a lateral cyclic axis input 306 corresponding to the lateral cyclic axis. For example, the collective axis input 302 can be received from the collective trim assembly 300 of FIG. 2B, generated by the flight control computer 380 without pilot input (e.g., as part of an auto-hover feature of a rotorcraft), received from another source, a result of a combination of the foregoing, or established in another suitable fashion. Similarly, the longitudinal cyclic axis input 304 and the lateral cyclic axis input 306 can each be received from one of the cyclic trim assemblies 200 of FIG. 2B, generated by the flight control computer 380 without pilot input (e.g., as part of an auto-hover feature of a rotorcraft), received from another source, a result from a combination of the foregoing, or established in another suitable fashion.

In a typical embodiment, the collective axis input 302, the longitudinal cyclic axis input 304 and the lateral cyclic axis input 306 are representative of a time series of control inputs received by the collective filter system 310, the longitudinal filter system 320 and the lateral filter system 330, respectively. In that way, in various embodiments, the collective filter system 310, the longitudinal filter system 320 and the lateral filter system 330 can, in real-time, receive a time series of control inputs in relation to the collective axis, the longitudinal cyclic axis and the lateral cyclic axis, respectively, as the control inputs are generated, for example, by the collective trim assembly 300, the cyclic trim assemblies 200 and/or the flight control computer 380, as appropriate.

The control filters 314, 324 and 334 can systematically or programmatically attenuate a control input in a preconfigured fashion. For example, in various embodiments, some or all of the control filters 314, 324 and 334 can be implemented as different notch filters that are, for example, "notched" around particular frequency values. In another example, some or all of the control filters 314, 324 and 334 can be implemented as roll-off filters or as a combination or series of notch filters. Although the control filters 314, 324 and 334 are each shown as including three filters, it should be appreciated that the control filters 314, 324 and 334 can each include only one control filter or any other suitable number of control filters to suit a given implementation.

The filter controllers 312, 322 and 332 can operate as logical switches for control outputs to the control logic 340. In general, the filter controllers 312, 322 and 332 cause a control output to be produced for each individual control input that is received via the collective axis input 302, the longitudinal cyclic axis input 304 and the lateral cyclic axis input 306, respectively. The filter controllers 312, 322 and 332 can each maintain a filter state relative to the collective axis input 302, the longitudinal cyclic axis input 304 and the lateral cyclic axis input 306 such that, at any given time, the filter state indicates a current source of control output to the control logic 340. Each filter state can be changed to represent a logical switching of how control output is produced.

For example, the filter controller 312 can maintain a filter state relative to the collective axis input 302. The filter state of the filter controller 312 can indicate whether the current source of control output to the control logic 340 is the collective axis input 302 or, alternatively, a control signal generated by the filter control system 350 via, for example, a particular control filter of the control filters 314. According to this example, if the current source of control output to the control logic 340 is the collective axis input 302, the filter controller 312 can allow control inputs received via the collective axis input 302 to be passed through, unfiltered, as control outputs to the control logic 340. Alternatively, if the filter state indicates that the source of control output to the control logic 340 is a particular control filter of the control filters 314, control inputs received via the collective axis input 302 can be processed by the particular control filter and an output of the particular control filter can be produced, with or without optional additional processing by the filter controller 312, as control outputs to the control logic 340.

The filter controllers 322 and 332 can each operate in similar fashion to the filter controller 312 relative to the longitudinal cyclic axis input 304 and the lateral cyclic axis input 306, respectfully. Therefore, in certain embodiments, the filter controllers 312, 322 and 332 are operable to each independently change its own filter state and thus logically switch the source of control output to the control logic 340. In certain embodiments, the filter controllers 312, 322 and 332 can also intercommunicate and change their own filter state in partial dependence on each other. A change in filter state can involve, for example, engaging a given filter at time when control input is not currently filtered, disengaging a given filter so as to return to an unfiltered state, disengaging a first filter and engaging a second filter, combinations of the foregoing and/or the like. In some embodiments, as an alternative to an unfiltered state, the filter controllers 312, 322 and/or 332 can use a selected control filter of the control filters 314, 324 and/or 334 to provide lighter, less aggressive filtering relative to other control filters.

In certain embodiments, the filter controllers 312, 322 and 332 can each establish or change filter state by repeatedly analyzing the collective axis input 302, the longitudinal cyclic axis input 304 and the lateral cyclic axis input 306, respectively, as waves over sample periods. The filter controllers 312, 322 and 332 can each establish or change filter state using the configurations 316, 326 and 336. In general, the configurations 316, 326 and 336 can include information usable by the filter controllers 312, 322 and 332, respectively, to establish or change the filter state of the collective filter system 310, the longitudinal filter system 320 and the lateral filter system 330, respectively.

In an example, the configurations 316, 326 and 336 can include engagement settings for each of the control filters 314, 324 and 334, respectively. The engagement settings can include criteria setting forth when to engage each of the control filters 314, 324 and 334. As described previously, the filter controllers 312, 322 and 332 can each establish or change filter state by analyzing the collective axis input 302, the longitudinal cyclic axis input 304 and the lateral cyclic axis input 306, respectively, as waves over sample periods. In these embodiments, example engagement settings include, but are not limited to, a frequency threshold, a peak amplitude threshold (e.g., representative of a peak amount of control movement being input by a pilot or flight control computer, in the form of a control input, over a given sample period) and/or a time-based threshold.

In an example, a given control filter could be engaged if a corresponding frequency threshold and/or a corresponding peak amplitude threshold is satisfied over a sample period. In certain embodiments, the time-based threshold can provide a further precondition to engagement, such that the given control filter is only engaged if the corresponding frequency threshold and/or the corresponding peak amplitude threshold is satisfied for a threshold period of time, or over a succession of sample periods of the same or similar length. In various cases, the time-based threshold can be expressed as a division of time (e.g., seconds) or as a proxy for time such as, for example, a number of cycles, where the number of cycles can be converted to a division of time given a known sampling rate of the filter control system 350.

In another example, the configurations 316, 326 and 336 can include disengagement settings for each of the control filters 314, 324 and 334, respectively. The disengagement settings can include criteria setting forth when to disengage each of the control filters 314, 324 and 334. In similar fashion to the example engagement settings described above, example disengagement settings include, but are not limited to, a frequency threshold, a peak amplitude threshold and/or a time-based threshold. In some embodiments, the disengagement settings for each control filter of the control filters 314, 324 and 334 can be an expression of at least some of the same thresholds as the engagement settings for that control filter, except that disengagement would typically require that the frequency and/or peak amplitude thresholds expressed therein not be satisfied. It should be appreciated that the disengagement settings for some or all of the control filters 314, 324 and 334 can also express thresholds and values that are entirely distinct from any thresholds or values expressed in the engagement settings for those control filters.

In an example, a given control filter could be disengaged, after it has been engaged, if a corresponding frequency threshold and/or a corresponding peak amplitude threshold are not satisfied over a sample period. In certain embodiments, the time-based threshold can provide a further precondition to disengagement, such that the given control filter is only disengaged if the corresponding frequency threshold and/or the corresponding peak amplitude threshold is not satisfied for a threshold period of time, or over a succession of sample periods of the same or similar length. The time-based threshold of the disengagement settings can also be an independent precondition to disengagement, such that the given control filter is simply disengaged once the threshold period of time is satisfied. In various cases, the time-based threshold can be expressed as a division of time (e.g., seconds) or as a proxy for time such as, for example, a number of cycles, where the number of cycles can be converted to a division of time given a known sampling rate of the filter control system 350.

In another example, the configurations 316, 326 and 336 can include escalation settings. As discussed previously, the control filters 314, 324 and/or 334 can attenuate in various fashions, some more aggressively than others. In certain embodiments, the escalation settings of the configurations 316, 326 and 336 can arrange all or a subset of the control filters 314, 324 and 334, respectively, in an ascending order of criticality, and include thresholds of a similar form and type as the engagement settings discussed above. In some embodiments, the escalation settings can be implemented via special configuration of the engagement settings. As threshold(s) for more aggressive filtering are attained, the filter controllers 312, 322 and/or 332 can disengage a current filter and engage a next filter in the arrangement according to the ascending order of criticality.

In certain embodiments, the configurations 316, 326 and 336 can also include de-escalation settings. In certain embodiments, the de-escalation settings of the configurations 316, 326 and 336 can arrange all or a subset of the control filters 314, 324 and 334, respectively, in a descending order of criticality, and include thresholds of a similar form and type as the disengagement settings discussed above. In some cases, the descending order of criticality can simply be a reversal of the ascending level of criticality used for escalation. In some embodiments, the de-escalation settings can be implemented via special configuration of the disengagement settings. As threshold(s) for less aggressive filtering are attained, the filter controllers 312, 322 and/or 332 can disengage a current filter and engage a next filter in the arrangement according to the descending order of criticality, until eventually the filter controllers 312, 322 and/or 332 return to an unfiltered state.

In a typical embodiment, the configurations 316, 326 and 336 can be adjusted via communication with the client 344. For example, thresholds of the type described above can be increased or decreased in order to improve operation and utilization of the control filters 314, 324 and 334. The client 344 can be implemented in a computing system, such as one or more physical computing machines. For example, the client 344 can be a desktop, laptop, tablet, wireless handheld device (such as a smartphone or PDA), wearable or body-borne computer or the like.

The control logic 340 transforms and/or converts control outputs of the collective filter system 310, the longitudinal filter system 320 and the lateral filter system 330 into control signals that are sent to the one or more actuator(s) 342. In this manner, the flight control computer 380 can cause actuation in response to, or in correspondence to, each control input (e.g., in a filtered or unfiltered fashion). The one or more actuators 342 represent devices that control motion of a controllable element in the aircraft. Examples of the one or more actuators 342 include a swashplate actuator, a pitch-link actuator, an on-blade actuator and a control surface actuator such as an elevator or an aileron.

Figure 4:
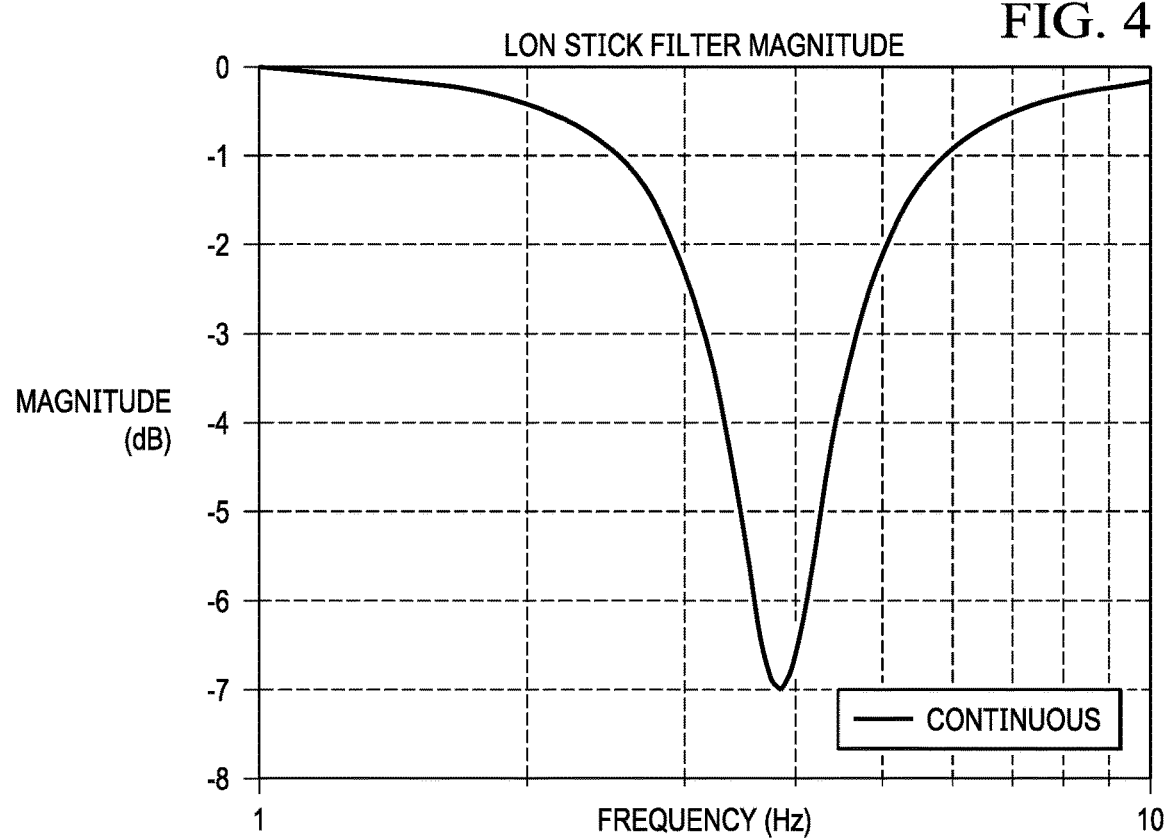
FIG. 4 illustrates an example plot of an example notch filter.

FIG. 4 illustrates an example plot of an example notch filter that can serve, for example, as one of the control filters 314, 324 and 334 of FIG. 4. The example notch filter of FIG. 4 is notched around approximately 3.85 hertz.

Figure 5:
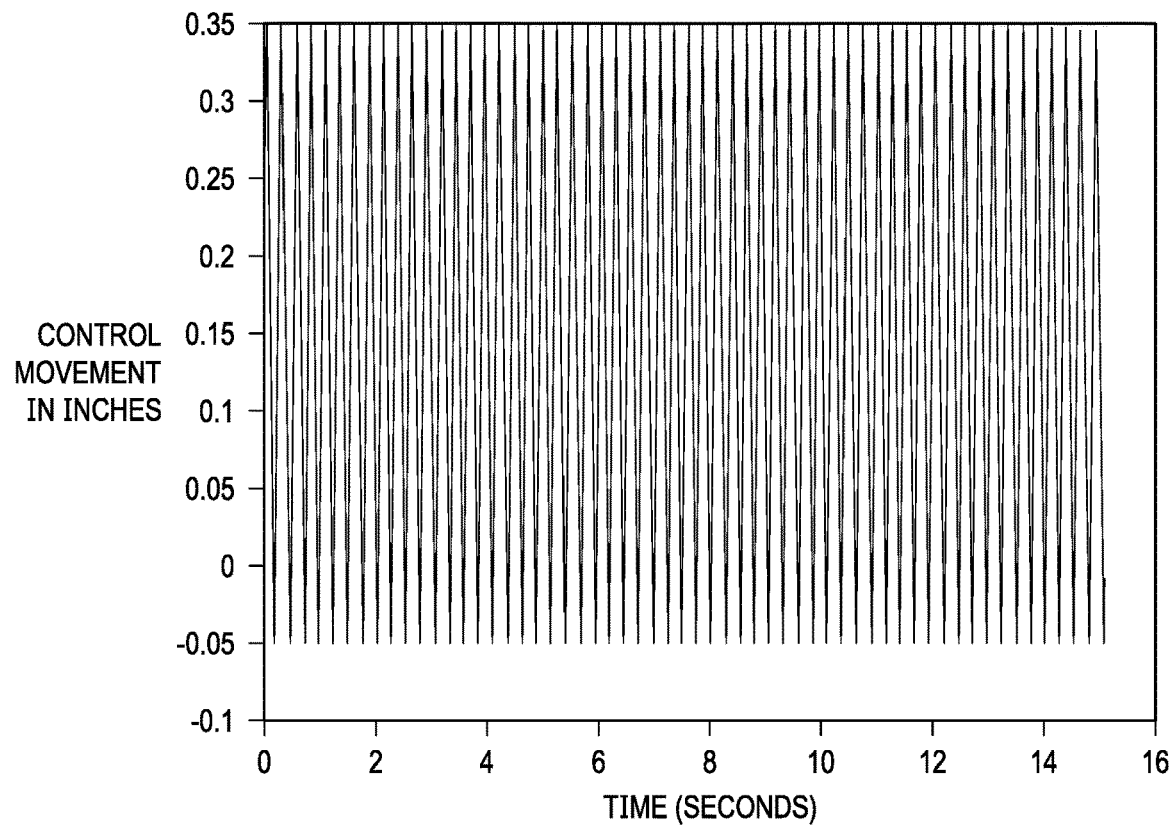
FIG. 5 illustrates an example plot of an example wave without filtration using a control filter.

FIG. 5 illustrates an example plot of an example wave without filtration using a control filter. In the example of FIG. 5, the example wave is plotted relative to "inches" of movement in a pilot control. The example plot illustrates, for a given time series of control inputs over a fifteen second sample period, oscillation of 0.2 inches and a frequency of approximately 3.85 hertz. The oscillation of 0.2 inches can constitute the peak amplitude over the sample period.

Figure 6:
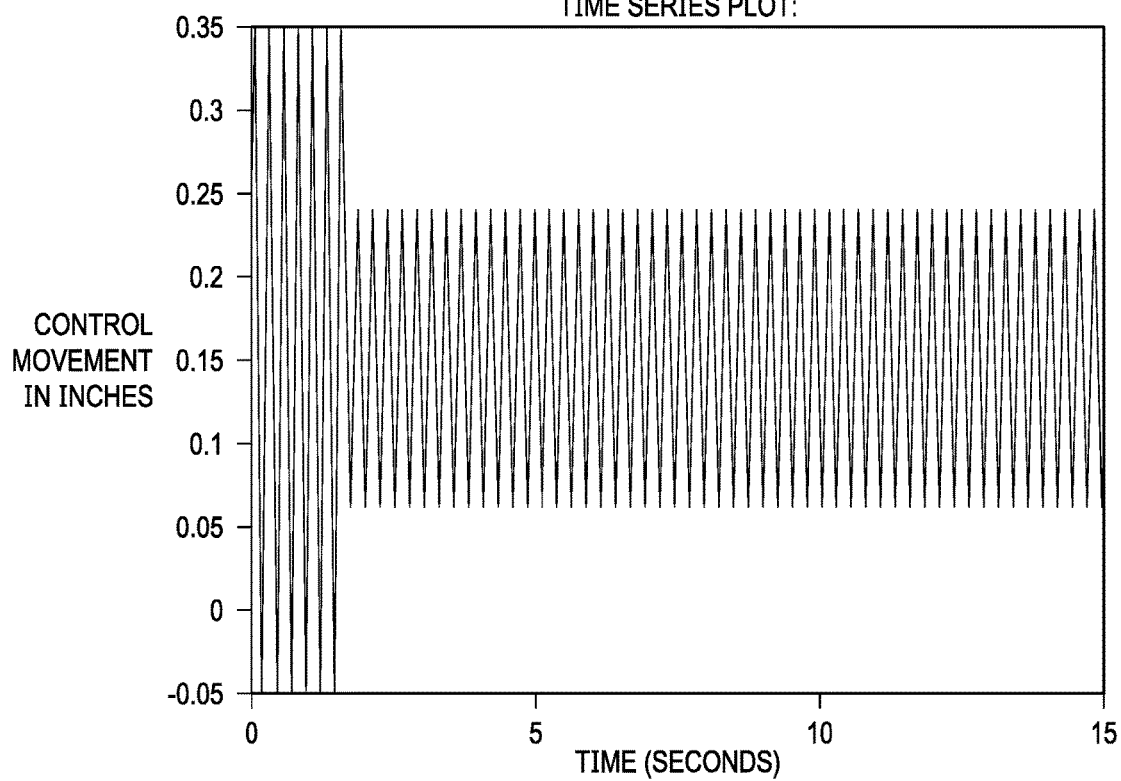
FIG. 6 illustrates an example plot of an example wave with filtration using a control filter.

FIG. 6 illustrates an example plot of the example wave of FIG. 5, with filtration being applied at approximately three seconds using the example notch filter of FIG. 4.

Figure 7:
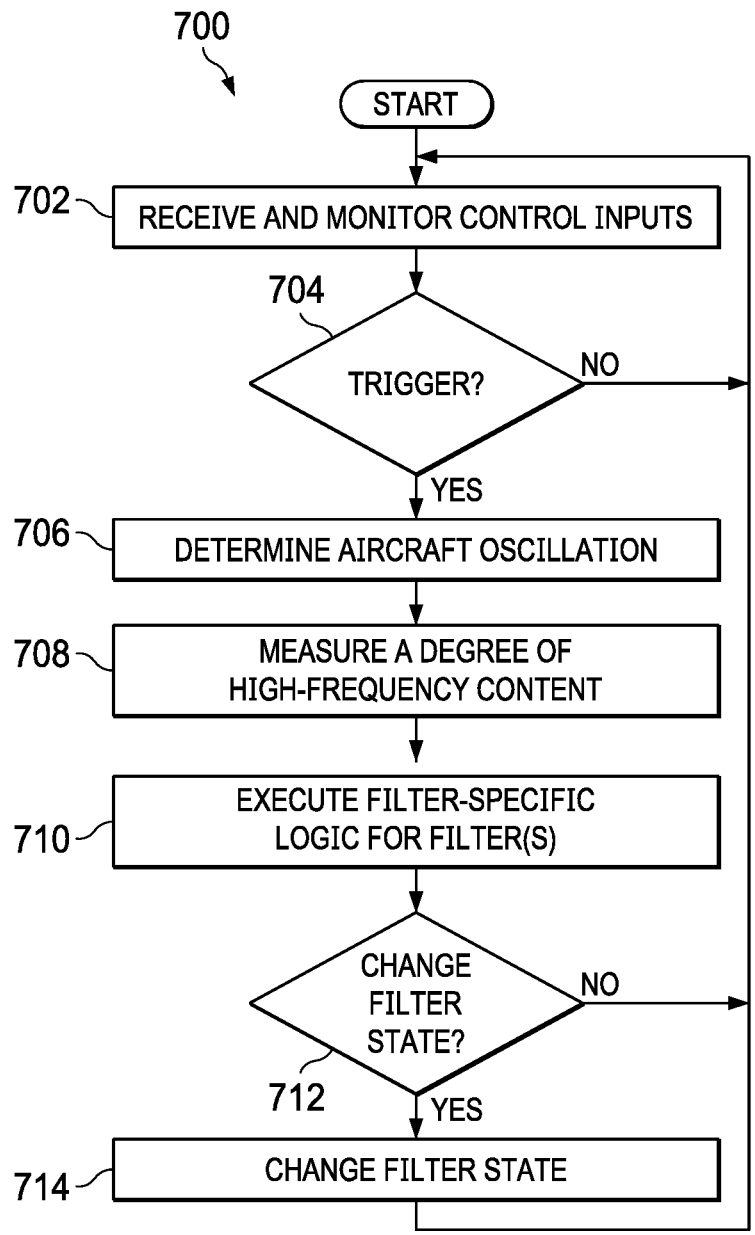
FIG. 7 illustrates an example of a process for performing filter control on an aircraft.

FIG. 7 illustrates an example of a process 700 for performing filter control on an aircraft. In an example, the process 700 can be executed by the filter controller 312 in relation to a collective axis of the aircraft. In another example, the process 700 can be executed by the filter controller 322 in relation to a longitudinal cyclic axis of the aircraft. In yet another example, the process 700 can be executed by the filter controller 332 in relation to a lateral cyclic axis of the aircraft. Although the process 700 can be executed by any number of different controllers and components in relation to any number of different control axes, to simplify discussion, the process 700 will be described generically relative to a filter controller and a control axis of an aircraft.

At block 702, the filter controller receives and monitors control inputs in relation to the control axis of the aircraft. Over time, the received control inputs represent a time series of control inputs. At decision block 704, the filter controller determines whether to trigger an evaluation of its filter state. In various embodiments, the filter controller can evaluate its filter state every cycle, every other cycle, continuously, or on any interval that may be suitable in a given implementation. If the filter controller determines at the decision block 704 to trigger an evaluation of its filter state, the process 700 proceeds to block 706. Otherwise, the process 700 returns to block 702 and proceeds as described previously.

At block 706, the filter controller determines aircraft oscillation over a sample period. The sample period can cover, or correspond to, a time series of control inputs resulting from iterations of the block 702. In some cases, the filter controller can determine aircraft oscillation in the control axis. In such cases, the aircraft oscillation in the control axis can be measured by the filter controller, for example, from the time series of control inputs. In addition, or alternatively, the filter controller can determine aircraft oscillation in a feedback axis. For example, the aircraft oscillation in the feedback axis can be measured by the filter controller from feedback data received from a sensor such as an accelerometer or a gyroscope.

At block 708, the filter controller measures a degree of high-frequency content in the measured oscillation. In some embodiments, the block 708 can involve the filter controller applying a high-pass filter to the control input, where the high-pass filter allows high-frequency signals to pass but attenuates frequencies lower than a cutoff frequency. In various embodiments, the cutoff frequency can be configurable for the aircraft. In these embodiments, the block 708 can produce high-pass filter output. In certain embodiments, if the high-pass filter output is zero or below a configurable threshold, the process 700 can terminate.

At block 710, the filter controller executes filter-specific logic for each control filter of the control filters that it controls, or a configurable subset thereof, using stored configurations. For example, the filter controllers 312, 322 and 332 of FIG. 3 could be considered to control the control filters 314, 324 and 334, respectively. The stored configurations can be similar, for example, to the configurations 316, 326 or 336 of FIG. 3. In general, the block 710 can include evaluating information related to the determined aircraft oscillation from block 706 and/or the measured degree of high-frequency content from block 708. Examples of functionality that can be performed at the block 710 will be described in greater detail with respect to FIG. 8. In general, the filter-specific logic of each control filter can produce an output indicative of that control filter's applicability to the control situation at hand.

At decision block 712, the filter controller determines whether to change its filter state. The determination can be made at least partly based on the configurations. The decision block 712 can include evaluating outputs of the block 710, which outputs are indicative, for each filter that the filter controller controls, of whether the control filter's engagement settings, or disengagement settings, as applicable, are satisfied. In some embodiments, the filter controller can further include logic for selecting among multiple filters, if multiple filters are applicable. In addition, the filter controller can use escalation and de-escalation settings as described previously. If the filter controller determines at the decision block 712 to change its filter state, the process 700 proceeds to block 714. Otherwise, the process 700 returns to block 702 and proceeds as described previously.

At block 714, the filter controller changes its filter state and thereby performs a logical switch for control output. For example, in various cases, the filter controller can engage a given filter at a time when control input is not currently filtered, disengage a given filter so as to return to an unfiltered state, disengage a first filter and engage a second filter, combinations of the foregoing and/or the like. In general, the filter controller thereafter produces control outputs according to its changed filter state. From block 714, the process 700 returns to block 702 and proceeds as described previously. In various embodiments, the process 700 can continue to iterate until stopped by a pilot or user, the aircraft has landed or other suitable stop criteria has been satisfied.

Figure 8:
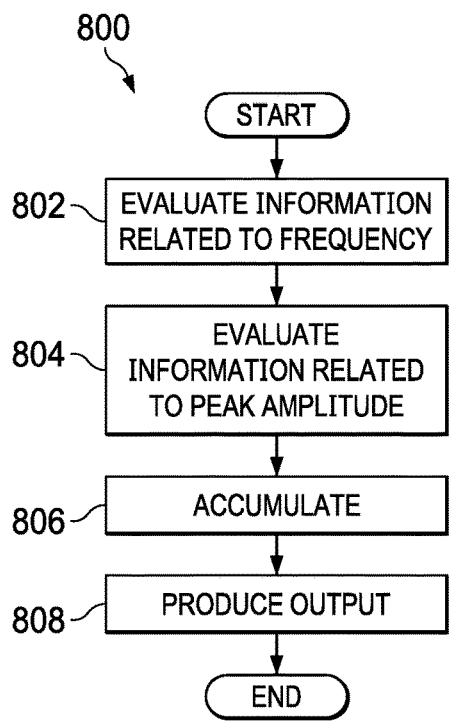
FIG. 8 illustrates an example of a process for executing filter-specific logic in a filter control system on an aircraft.

FIG. 8 illustrates an example of a process 800 for executing filter-specific logic in a filter control system on an aircraft. In an example, the process 800 can be executed by the filter controller 312 in relation to a collective axis of the aircraft. In another example, the process 800 can be executed by the filter controller 322 in relation to a longitudinal cyclic axis of the aircraft. In yet another example, the process 800 can be executed by the filter controller 332 in relation to a lateral cyclic axis of the aircraft. Although the process 800 can be executed by any number of different controllers and components in relation to any number of different control axes, to simplify discussion, the process 800 will be described generically relative to a filter controller and a control axis.

In certain embodiments, the process 800 can be performed as all or part of the block 710 of the process 700 FIG. 7. In addition, relative to the block 710 of the process 700 of FIG. 7, the filter controller can perform multiple iterations of the process 800, in parallel or in sequence, for each control filter controlled by the filter controller or a configurable subset thereof. Although the process 800 can be iterated through for any number of different control filters, for simplicity of description, the process 800 will be described in a single iteration relative to a control filter.

At block 802, the filter controller evaluates information related to a measured frequency over a sample period. In certain embodiments, the filter controller can compare, for example, the information related to the measured frequency, to a frequency threshold specified in engagement or disengagement settings, as appropriate, for the control filter. The information related to the measured frequency can be represented, for example, in the determined oscillation from block 706 of FIG. 7, in the high-pass filter output from block 708 of FIG. 7, or in other suitable information.

At block 804, the filter controller evaluates information related to a peak amplitude over the sample period. For example, the filter controller can compare the peak amplitude represented in the determined oscillation from block 706 of FIG. 7 to a peak amplitude threshold specified in engagement or disengagement settings, as appropriate, for the control filter. In various cases, the peak amplitude can be representative of a peak amount of control movement being input by a pilot or flight control computer, in the form of a control input, over the sample period (e.g., in terms of inches or magnitude).

At block 806, the filter controller accumulates obtained data for the sample period. For example, if the control filter is currently disengaged, and the frequency threshold and the peak amplitude threshold (as represented in the engagement settings) are satisfied at the blocks 802 and 804, respectively, the filter controller can proportionally increment or increase a running time-based value for the control filter. In various cases, the running time-based value can be incremented or increased, in successive iterations of the process 800 with respect to the control filter, up to a time-based threshold specified in the engagement settings for the control filter. Alternatively, if the control filter is currently disengaged, and the frequency threshold and the peak amplitude threshold are not satisfied at the blocks 802 and 804, respectively, the running time-based value can be reset to zero.

By way of further example, if the control filter is currently engaged, and the frequency threshold and the peak amplitude threshold (as represented in the disengagement settings) are not satisfied at the blocks 802 and 804, the filter controller can proportionally decrement or decrease a running time-based value for the control filter. In various cases, the time-based value can be decremented or decreased, in successive iterations of the process 800 with respect to the control filter, down to zero. Alternatively, if the control filter is currently engaged, and the frequency threshold and the peak amplitude threshold (as represented in the disengagement settings) are satisfied at blocks 802 and 804, the running time-based value can be reset to the time-based threshold.

At block 808, an output is produced. In certain embodiments, the output can be indicative of the running time-based value described above with respect to the block 806. For example, the output can a value between zero and one, such that the output expresses the running time-based value as a proportion of the time-based threshold. The output can also be expressed in other suitable fashions that will be apparent to one skilled in the art after reviewing the present disclosure.

For illustrative purposes, the process 800 is described relative to an example in which engagement and disengagement settings include a frequency threshold, a peak amplitude threshold and a time-based threshold. It should be appreciated that, in various embodiments, any combination of the foregoing thresholds can be used in various implementations. For example, in some implementations, a satisfaction (or non-satisfaction) of a frequency threshold, by itself, may be a sufficient basis to engage (or disengage) a control filter. According to this example, blocks 804-806 may be omitted and the output produced at block 808 could be, for example, one, or another suitable value indicative that engagement settings are satisfied. In another example, in the case of disengagement, the passage of a period time, as represented in a time-based threshold, may be a sufficient basis, by itself, to disengage a control filter. According to this example, blocks 802-804 can be omitted and the output produced at block 808 could be, for example, zero, or another suitable value indicative that disengagement settings are satisfied.

Advantageously, in certain embodiments, the principles described above relative to FIGS. 1-8 can introduce performance benefits. In certain embodiments, control filters can be engaged when, for example, certain frequency-related engagement settings indicate that their use is needed. In these embodiments, control filters can be disengaged at all other times. In that way, the cost of using filters, which typically manifests in the form of reduced control responsiveness, can be avoided at other times.

Although various illustrative examples are described above relative to a rotorcraft, it should be appreciated that the principles described herein can similarly be applied to any aircraft in which a flight control computer is responsible for sending control signals to aircraft. In addition, it should be appreciated that the principles described herein can similarly be applied to an aircraft that is simulated via software.

Figure 9:
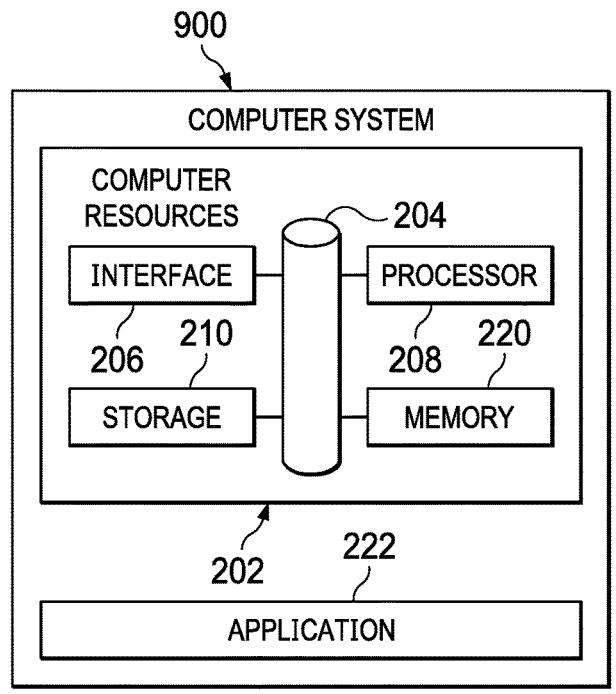
FIG. 9 illustrates an example of a computer system.

FIG. 9 illustrates an example of a computer system 900. In some cases, the computer system 900 can be representative, for example, of a flight control computer such as, for example, the flight control computer 180 of FIG. 1 and/or the flight control computer 380 of FIG. 3, or a computer system that simulates an aircraft. The computer system 900 includes an application 222 operable to execute on computer resources 202. The application 222 can include, for example, logic for determining what control filter, if any, to implement, what control signal to send to an actuator, filter-specific logic, combinations of the foregoing and/or the like. In particular embodiments, the computer system 900 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 900 may include any suitable physical form, configuration, number, type and/or layout. As an example, and not by way of limitation, the computer system 900 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 900 may include one or more computer systems; be unitary or distributed; span multiple locations; span multiple machines; or reside in a cloud, which may include one or more cloud components in one or more networks.

In the depicted embodiment, the computer system 900 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components, (e.g., memory 220), the application 222. Such functionality may include providing various features discussed herein. In particular embodiments, processor 208 may include hardware for executing instructions, such as those making up the application 222. As an example, and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example, and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses. Depending on the embodiment, processor 208 may include any suitable number of any suitable internal registers, where appropriate. Where appropriate, processor 208 may include one or more arithmetic logic units (ALUs); be a multi-core processor; include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 900, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example, and not by way of limitation, the computer system 900 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. For example, in various embodiments, storage 210 can store configurations such as the configurations 316, 326 and/or 336 of FIG. 3. As an example, and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 900, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may include any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packet-based communication) among any networks, any network devices, and/or any other computer systems. As an example, and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 900 is used. As an example, and not by way of limitation, computer system 900 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 900 may include any suitable interface 206 for any one or more of these networks, where appropriate.

In some embodiments, interface 206 may include one or more interfaces for one or more I/O devices. One or more of these I/O devices may enable communication between a person and the computer system 900. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 900 to each other. As an example, and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a control computer:
receiving a time series of control inputs in relation to a control axis of an aircraft, wherein the control computer causes actuation in response to each control input in the time series as the control input is received;
determining aircraft oscillation over a sample period corresponding to the time series;
evaluating information related to the determined aircraft oscillation using engagement settings associated with a control filter;
engaging the control filter responsive to the information satisfying the engagement settings, wherein the engaged control filter systematically attenuates future control inputs in relation to the control axis prior to actuation responsive thereto; and
disengaging an already-engaged control filter so as to logically switch to the control filter for the future control inputs.

2. The method of claim 1, wherein:
the engagement settings comprise a frequency threshold;
the evaluated information comprises information related to frequency over the sample period; and
the evaluating comprises evaluating the information related to frequency relative to the frequency threshold.

3. The method of claim 2, comprising:
prior to the evaluating, measuring a degree of high-frequency content in the determined aircraft oscillation over the sample period; and
wherein the information related to frequency comprises the measured degree of high-frequency content.

4. The method of claim 2, wherein:
the engagement settings comprise a time-based threshold;
the evaluated information comprises information related to a period of time over which the frequency threshold has been satisfied; and
the evaluating comprises evaluating the information related to a period of time relative to the time-based threshold.

5. The method of claim 2, wherein:
the engagement settings comprise an amplitude threshold;
the evaluated information comprises information related to a peak amplitude over the sample period; and
the evaluating comprises evaluating the information related to peak amplitude relative to the amplitude threshold.

6. The method of claim 1, comprising:
receiving a subsequent time series of control inputs in relation to the control axis of the aircraft;
determining aircraft oscillation over a subsequent sample period corresponding to the subsequent time series;
evaluating information related to the determined aircraft oscillation over the subsequent sample period using disengagement settings associated with the control filter; and
disengaging the control filter responsive to the information related to the determined aircraft oscillation over the subsequent sample period satisfying the disengagement settings.

7. The method of claim 1, comprising:
receiving a subsequent time series of control inputs in relation to the control axis of the aircraft;
determining aircraft oscillation over a subsequent sample period corresponding to the subsequent time series;
evaluating information related to the determined aircraft oscillation over the subsequent sample period using escalation settings, wherein the escalation settings specify an arrangement of control filters in an ascending order of criticality, and wherein the arrangement comprises the control filter;
responsive to a determination that the information related to the determined aircraft oscillation over the subsequent sample period satisfies specified criteria for more aggressive filtering:
disengaging the control filter; and
engaging a next control filter in the arrangement according to the ascending order of criticality.

8. The method of claim 1, wherein the aircraft comprises a simulated aircraft.

9. The method of claim 1, wherein the control axis comprises at least one of a collective axis, a lateral cyclic axis and a longitudinal cyclic axis.

10. The method of claim 1, comprising:
receiving a new control input in relation to the control axis;
filtering the new control input via the engaged control filter;
converting the filtered new control input into a control signal; and
sending the control signal to an actuator for actuation.

11. The method of claim 1, wherein the time series of control inputs are generated without pilot input.

12. The method of claim 1, wherein the determining aircraft oscillation comprises at least one of:
measuring aircraft oscillation in a feedback axis based at least partly on feedback data received from a sensor; and
measuring aircraft oscillation in the control axis based at least partly on the time series of control inputs.

13. A flight control computer for an aircraft, the flight control computer comprising:
a first control filter;
first stored configurations, wherein the first stored configurations comprise first engagement settings associated with the first control filter; and
a first filter controller configured to:
receive a first time series of control inputs in relation to a first control axis of the aircraft, wherein the flight control computer causes actuation in response to each control input in the first time series as the control input is received;
determine aircraft oscillation over a first sample period corresponding to the first time series;
evaluate information related to the determined aircraft oscillation over the first sample period using the first engagement settings;
engage the first control filter responsive to the information satisfying the first engagement settings, wherein the engaged first control filter systematically attenuates future control inputs in relation to the first control axis prior to actuation responsive thereto; and disengage an already-engaged control filter so as to logically switch to the first control filter for the future control inputs.

14. The flight control computer of claim 13, wherein the flight control computer is configured to:

receive a new control input in relation to the first control axis;

filter the new control input via the engaged first control filter; and convert the filtered new control input into a control signal; and send the control signal to an actuator for actuation.

15. The flight control computer of claim 13, comprising:

a second control filter;

second stored configurations, wherein the second stored configurations comprise second engagement settings associated with the second control filter; and a second filter controller configured to:

receive a second time series of control inputs in relation to a second control axis of the aircraft, wherein the flight control computer causes actuation in response to each control input in the second time series as the control input is received;

determine aircraft oscillation over a second sample period corresponding to the second time series;

evaluate information related to the determined aircraft oscillation over the second sample period using the second engagement settings; and engage the second control filter responsive to the information satisfying the second engagement settings, wherein the engaged second control filter systematically attenuates future control inputs in relation to the second control axis prior to actuation responsive thereto.

16. The flight control computer of claim 15, comprising:

a third control filter;

third stored configurations, wherein the third stored configurations comprise third engagement settings associated with the third control filter; and a third filter controller configured to:

receive a third time series of control inputs in relation to a third control axis of the aircraft, wherein the flight control computer causes actuation in response to each control input in the third time series as the control input is received;

determine aircraft oscillation over a third sample period corresponding to the third time series;

evaluate information related to the determined aircraft oscillation over the third sample period using the third engagement settings; and engage the third control filter responsive to the information satisfying the third engagement settings, wherein the engaged third control filter systematically attenuates future control inputs in relation to the third control axis prior to actuation responsive thereto.

17. The flight control computer of claim 16, wherein:

the first control axis comprises a collective axis of the aircraft;

the second control axis comprises a lateral cyclic axis of the aircraft; and the third control axis comprises longitudinal cyclic axis of the aircraft.

18. The flight control computer of claim 13, wherein:

the first engagement settings comprise a frequency threshold, an amplitude threshold and a time-based threshold;

the evaluated information comprises:

information related to frequency over the first sample period;

information related to a peak amplitude over the first sample period; and information related to a period of time over which the frequency threshold and the amplitude threshold have been satisfied; and the evaluation comprises:

evaluating the information related to frequency relative to the frequency threshold;

evaluating the information related to peak amplitude relative to the amplitude threshold;

proportionally increasing a running time-based value responsive to a determination that the frequency threshold and the amplitude threshold are satisfied; and producing an output that expresses the running time-based value as a proportion of the time-based threshold.

19. A computer-program product comprising a non-transitory computer-usable medium having computer-readable program code embodied therein, the computer-readable program code adapted to be executed to implement a method comprising:

receiving a time series of control inputs in relation to a control axis of an aircraft, wherein a control computer causes actuation in response to each control input in the time series as the control input is received;

determining aircraft oscillation over a sample period corresponding to the time series;

evaluating information related to the determined aircraft oscillation using engagement settings associated with a control filter;

engaging the control filter responsive to the information satisfying the engagement settings, wherein the engaged control filter systematically attenuates future control inputs in relation to the control axis prior to actuation responsive thereto; and disengaging an already-engaged control filter so as to logically switch to the control filter for the future control inputs.

* * * * *